(12) United States Patent
Harada et al.

(10) Patent No.: US 11,770,785 B2
(45) Date of Patent: Sep. 26, 2023

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/608,554

(22) PCT Filed: Apr. 28, 2017

(86) PCT No.: PCT/JP2017/017024
§ 371 (c)(1),
(2) Date: Oct. 25, 2019

(87) PCT Pub. No.: WO2018/198343
PCT Pub. Date: Nov. 1, 2018

(65) Prior Publication Data
US 2020/0145950 A1 May 7, 2020

(51) Int. Cl.
*H04W 56/00* (2009.01)
*H04L 5/00* (2006.01)
*H04W 72/0446* (2023.01)
*H04W 72/23* (2023.01)
*H04W 72/30* (2023.01)

(52) U.S. Cl.
CPC ....... *H04W 56/0015* (2013.01); *H04L 5/0082* (2013.01); *H04W 72/0446* (2013.01); *H04W 72/23* (2023.01); *H04W 72/30* (2023.01)

(58) Field of Classification Search
CPC ........... H04W 56/0015; H04W 72/005; H04W 72/042; H04W 72/0446; H04L 5/0082
See application file for complete search history.

(56) References Cited

U.S. PATENT DOCUMENTS

| | | | |
|---|---|---|---|
| 2016/0308637 A1* | 10/2016 | Frenne | H04J 11/0069 |
| 2020/0413359 A1* | 12/2020 | Li | H04L 5/0094 |
| 2021/0298025 A1* | 9/2021 | Wang | H04W 72/0453 |

OTHER PUBLICATIONS

3GPP TSG RAN WG1 #88; R1-1702905 "NR-PBCH designs" Samsung; Athens, Greece; Feb. 13-17, 2017 (13 pages).
3GPP TSG RAN WG1 Meeting #88bis; R1-1705793 "On NR PBCH Design" ITL; Spokane, USA; Apr. 3-7, 2017 (8 pages).
3GPP TSG-RAN WG1 #88; R1-1702589 "PBCH design considerations" Qualcomm Incorporated; Athens, Greece; Feb. 13-17, 2017 (9 pages).
3GPP TSG-RAN WG1 Meeting #88bis; R1-1705841 "On Remaining System Information Delivery" Nokia, Alcatel-Lucent Shanghai Bell; Spokane, WA, USA; Apr. 3-7, 2017 (5 pages).
(Continued)

*Primary Examiner* — Eric Myers
(74) *Attorney, Agent, or Firm* — Osha Bergman Watanabe & Burton LLP

(57) ABSTRACT

A terminal is disclosed including a receiver and a processor. The receiver receives a synchronization signal block, the synchronization signal block including a synchronization signal and a broadcast channel. The processor determines a control resource set for receiving system information based on information notified by the broadcast channel. In other aspects, a radio communication method is also disclosed.

5 Claims, 11 Drawing Sheets

(56) References Cited

OTHER PUBLICATIONS

3GPP TSG RAN WG1 #88bis; Rt-1705321 "NR-PBCH design" Spokane, USA; Apr. 3-7, 2017 (8 pages).
Extended European Search Report issued in European Application No. 17907209.5, dated Jul. 30, 2020 (11 pages).
International Search Report issued in Application No. PCT/JP2017/017024, dated Jul. 25, 2017 (1 page).
Written Opinion issued in International Application No. PCT/JP2017/017024, dated Jul. 25, 2017 (3 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN);" Apr. 2010; Sophia Antipolis Valbonne, France (149 pages).
3GPP TSG RAN WG1 Meeting #88bis; R1-1705709; "Discussion on remaining system information delivery in NR;" NTT DOCOMO, Inc.; Apr. 3-7, 2017; Spokane, USA (4 pages).
3GPP TSG RAN WG1 Meeting #88bis; R1-1705708; "Discussion and evaluation on NR-PBCH design;" NTT DOCOMO, Inc.; Apr. 3-7, 2017; Spokane, USA (9 pages).
3GPP TSG RAN WG1 Meeting #88; R1-1702827 "Discussion on NR-PBCH design" NTT DOCOMO, Inc.; Athens, Greece; Feb. 13-17, 2017 (9 pages).
3GPP TSG RAN WG1 Meeting RAN1 #88; R1-1702177 "NR Synchronization Signal Time Indexing" Intel Corporation; Athens, Greece; Feb. 13-17, 2017 (5 pages).
3GPP TSG-RAN WG1#87; R1-1612807 "NR-PBCH Design" Nokia, Alcatel-Lucent Shanghai Bell; Reno, U.S.A.; Nov. 14-18, 2016 (10 pages).
Office Action issued in Japanese Application No. 2019-515044; dated Apr. 1, 2020 (6 pages).
Office Action issued in European Application No. 17907209.5, dated May 28, 2021 (7 pages).
Office Action issued in European Application No. 17 907 209.5 dated Nov. 4, 2021 (5 pages).
Office Action issued in Indian Application No. 201937044236; dated Jan. 31, 2022 (7 pages).
Office Action issued in Israeli Application No. 270222; dated Jun. 19, 2022 (3 pages).
Office Action issued in Indonesian Application No. P00201910709, dated Nov. 11, 2022 (8 pages).

* cited by examiner

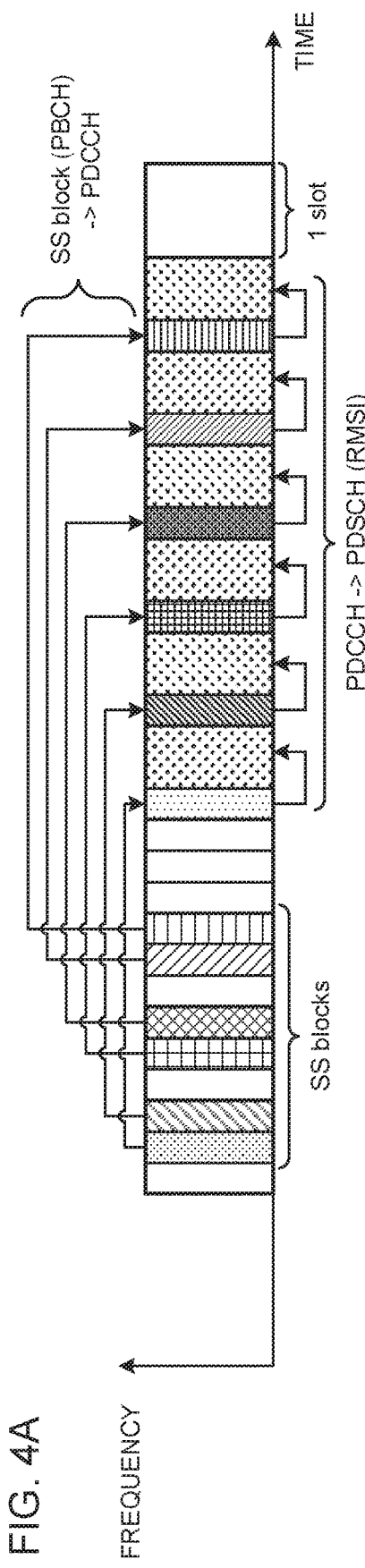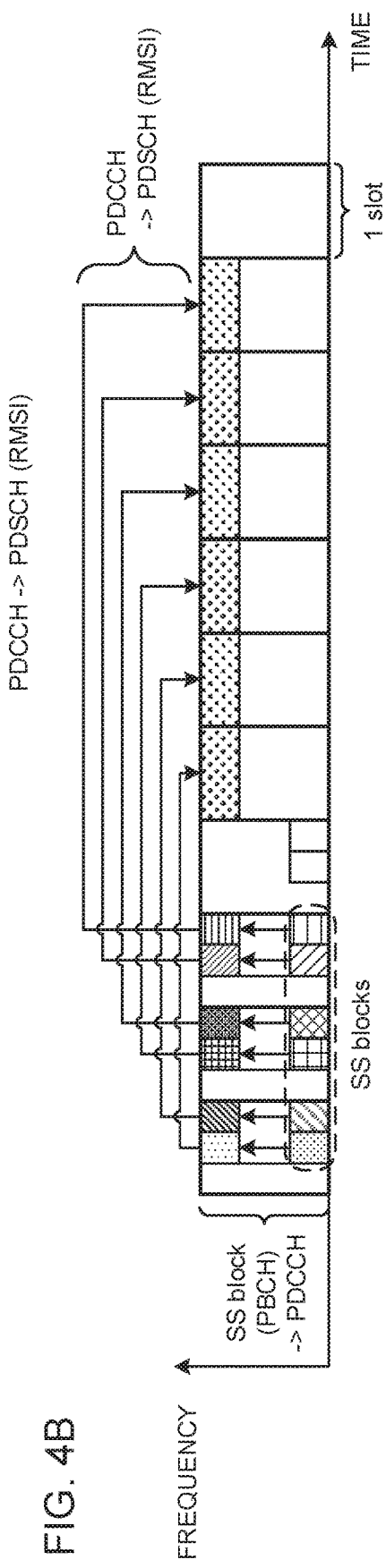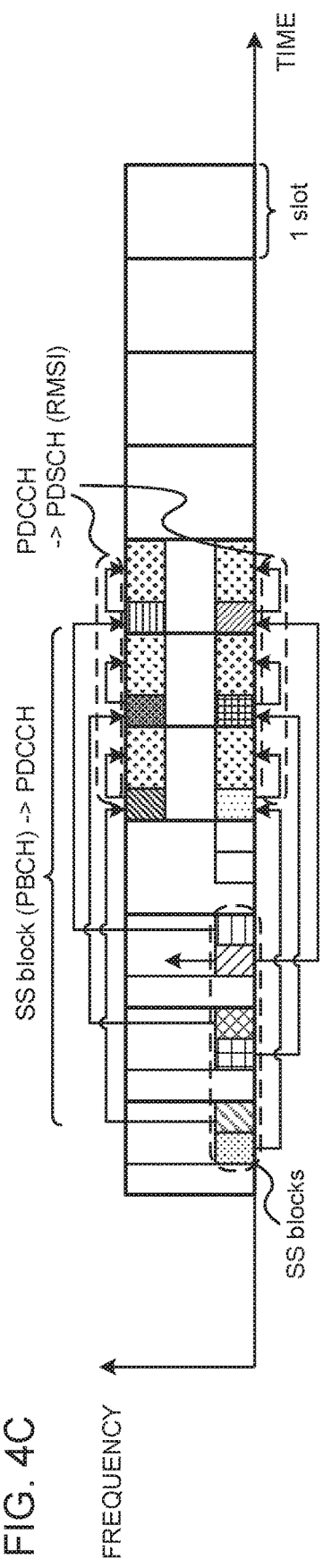

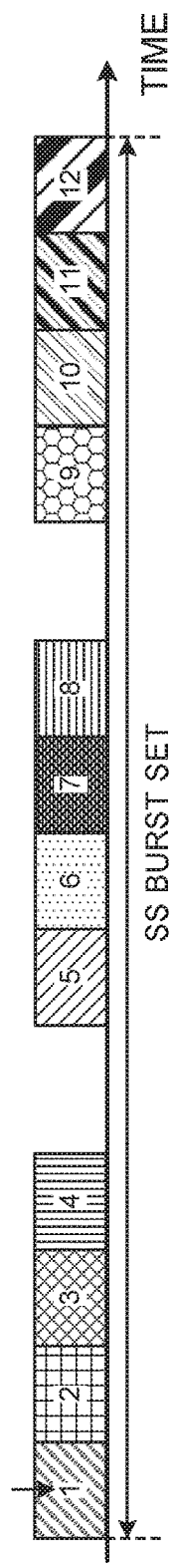
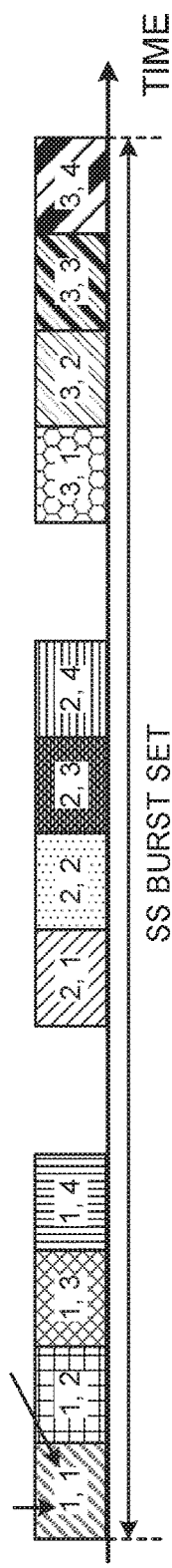
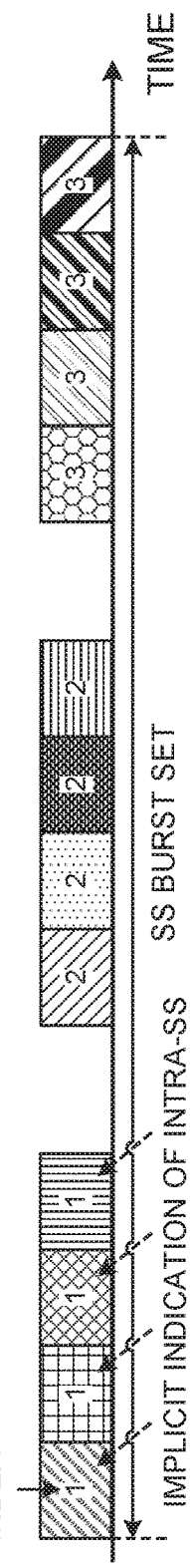
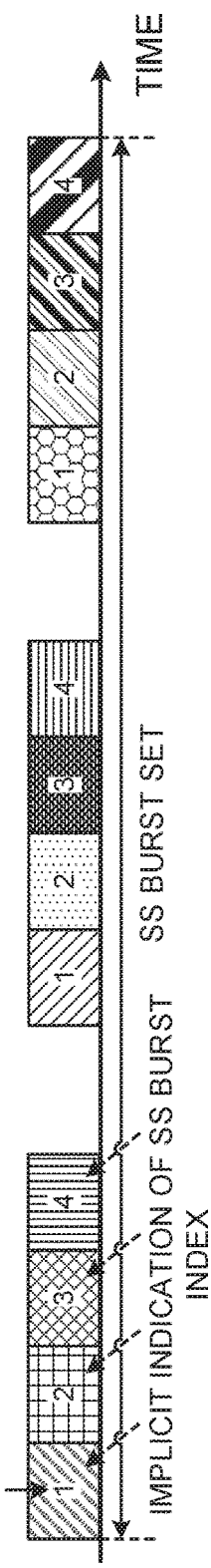

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high-speed data rates, providing lower latency and so on (see non-patent literature 1). In addition, the specification of LTE-A (LTE advanced and LTE Rel. 10, 11, 12 and 13) have also been drafted for the purpose of achieving increased capacity and enhancement beyond LTE (LTE Rel. 8 and 9).

Successor systems of LTE are also under study (for example, referred to as "FRA (Future Radio Access)," "5G (5th generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rel. 8 to 13), a user terminal (UE (User Equipment)) detects synchronization signals (PSS (Primary Synchronization Signal), SSS (Secondary Synchronization Signal), etc.) by way of cell search, and establishes synchronization with the network (for example, a base station (eNB (eNode B))), and identifies the cell to connect to (which is identified, for example, based on a cell ID (IDentifier)).

Also, after the cell search, the UE receives the master information block (MIB), which is transmitted in a broadcast channel (PBCH (Physical Broadcast CHannel)), system information blocks (SIB s)), which are transmitted in a shared data channel (PDSCH (Physical Downlink Shared CHannel)), and so forth, and acquires configuration information (which may be referred to as "broadcast information," "system information," etc.) that is for use for communicating with the network.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April 2010

SUMMARY OF INVENTION

Technical Problem

Now, envisaging future radio communication systems (for example, NR), study is in progress to define a resource unit that contains synchronization signals and a broadcast channel as an SS block (synchronization signal block), and gain initial access based on this SS block. However, regarding communication control based on SS blocks, there are things that have not been studied yet. Consequently, if communication is carried out inadequately, there may be a decline in communication throughput, spectral efficiency and so forth.

The present invention has been made in view of the above, and it is therefore an object of the present invention to provide a user terminal and a radio communication method, whereby, even when communication is controlled based on SS blocks, the decline in communication throughput and so on can be prevented.

Solution to Problem

According to one aspect of the present invention, a user terminal has a receiving section that receives one or more synchronization signal blocks, which include synchronization signals and broadcast channels, and a control section that specifies a control resource set, which is a candidate for transmitting a downlink control channel that is needed to receive minimal system information, based on a broadcast channel included in a certain synchronization signal block.

Advantageous Effects of Invention

According to the present invention, even when communication is controlled based on SS blocks, the decline in communication throughput and so on can be prevented.

BRIEF DESCRIPTION OF DRAWINGS

FIGS. 4A to 4C are diagrams to show examples of methods for specifying control resource sets based on certain rules or mathematical equations;
FIGS. 5A to 5D are diagrams to show examples of methods of specifying SS blocks.

DESCRIPTION OF EMBODIMENTS

Now, envisaging future radio communication systems (for example, LTE Rel. 14, 15 and later versions, 5G, NR and so on, hereinafter collectively referred to as "NR"), study is in progress to define a resource unit that contains synchronization signals and a broadcast channel as an SS block (synchronization signal block) and gain initial access based on this SS block.

Figure 1:
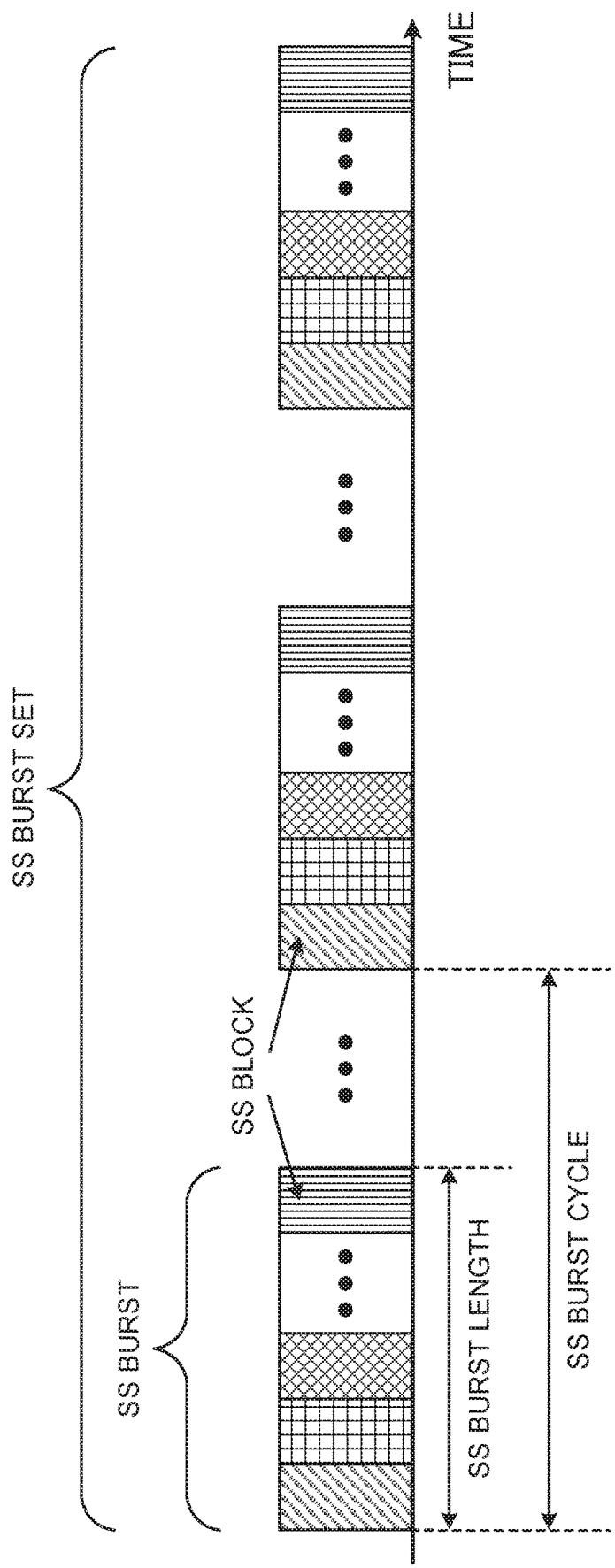
FIG. 1 is a diagram to explain the concept of SS blocks.

SS blocks will be described below with reference to FIG. 1. FIG. 1 is a diagram to explain the concept of SS blocks. An SS block, as shown in FIG. 1, contains at least a PSS for NR (NR-PSS), an SSS for NR (NR-SSS) and a PBCH for NR (NR-PBCH), which can be used for the same uses as the PSS, the SSS and the PBCH of existing LTE systems. Note that an SS block may also contain a synchronization signal (TSS (Tertiary SS)) apart from the PSS and SSS.

A set of one or multiple SS blocks may be referred to as an "SS burst." According to this example, an SS burst is comprised of a plurality of SS blocks that are contiguous in time, but this is by no means limiting. For example, an SS burst may be formed with SS blocks in which the frequency and/or time resources are contiguous, or may be formed with SS blocks in which the frequency and/or time resources are non-contiguous.

It is preferable that SS bursts are transmitted in a certain cycle (which may be referred to as "SS burst cycle"). Alternatively, SS bursts may not be transmitted on a regular basis (and may be transmitted aperiodically). As for the length of an SS burst and/or the cycle of SS bursts, an SS burst may be transmitted over a period of one or multiple subframes, one or multiple slots, and so on.

Also, one or more SS bursts may be referred to as an "SS burst set (SS burst series)." For example, a base station (which may be referred to as a "BS (Base Station)," a "TRP (Transmission/Reception Point)," an "eNB (eNode B)," a "gNB," etc.)) and/or UE may use one or multiple SS bursts contained in 1 SS burst set to apply beam sweeping to a plurality of SS blocks and transmit the SS burst set.

Note that SS burst sets are preferably transmitted periodically. UE may control receiving processes on the assumption that SS burst sets are transmitted periodically (in an SS burst set cycle).

The NR-PSS and the NR-SSS, or the NR-PSS (NR-SSS) and the NR-PBCH, may be time-division-multiplexed (TDM) or frequency-division-multiplexed (FDM).

For NR, the following initial access procedures to use SS blocks are under study. First, UE detects the NR-PSS (step S101). The UE roughly synchronizes time and frequency based on step S101, and identifies the scrambling ID (may be referred to as the "local ID") of an NR-SSS transmitted in an NR cell (a cell that supports NR).

Next, the UE detects the NR-SSS (step S102). The relative resource locations of the NR-PSS and the NR-SSS are specified in the specification. After S102 is finished, the UE can specify the cell ID.

The UE detects and decodes the NR-PBCH (step S103). The relative resource location of the NR-PBCH with respect to the NR-SSS (or the NR-PSS) is specified in the specification. Also, the UE can perform channel estimation for decoding the NR-PBCH based on a certain reference signal (for example, a DMRS (DeModulation Reference Signal)).

The NR-SSS and the NR-PBCH detected in steps S102 and S103 each correspond to the same SS block index as that of the NR-PSS.

The UE detects and decodes the downlink control channel (for example, a control channel for NR (NR-PDCCH (Physical Downlink Control CHannel))) that is needed to receive minimal system information (which, for example, may be referred to as "RMSI (Remaining Minimum System Information)") (step S104). The UE identifies configuration information of the NR-PDSCH for communicating RMSI, based on the NR-PDCCH.

The UE can detect the NR-PDCCH by monitoring a certain control resource set. Note that the control resource set refers to a set of candidate resources for transmitting a downlink control channel (NR-PDCCH), and may be referred to as a "CORSET (COntrol Resource SET)," a "control subband," a "control channel search space," a "search space set," a "search space resource set," a "control field," a "control subband," an "NR-PDCCH field," and so on. The control resource set according to the present specification primarily refers to a set of control resources necessary for receiving RMSI, but this is by no means limiting.

The UE decodes the NR-PDSCH and acquires RMSI based on the NR-PDSCH configuration information acquired in step S104 (step S105). The UE identifies at least the RACH (Random Access CHannel) configuration based on the RMSI.

The UE performs random access procedures based on the RACH configuration (step S106).

Now, envisaging NR, research is underway on system operation using a single beam or multiple beams. For example, in the event of multi-beam operation, it might occur that multiple SS blocks are subject to beam sweeping, and a whole SS burst set repeats being transmitted, periodically. Also, the PSS, SSS and PBCH corresponding to the same SS block index may be transmitted in the same beam.

In such a case, it is preferable that UE can identify an SS block transmitted from the network amongst a plurality of SS blocks. However, not much research has been done on how to allow UE to identify SS blocks. Furthermore, in which resource the NR-PDCCH should be monitored (which control resource set should be monitored) after a certain SS block is detected has not been studied much.

Figure 2:
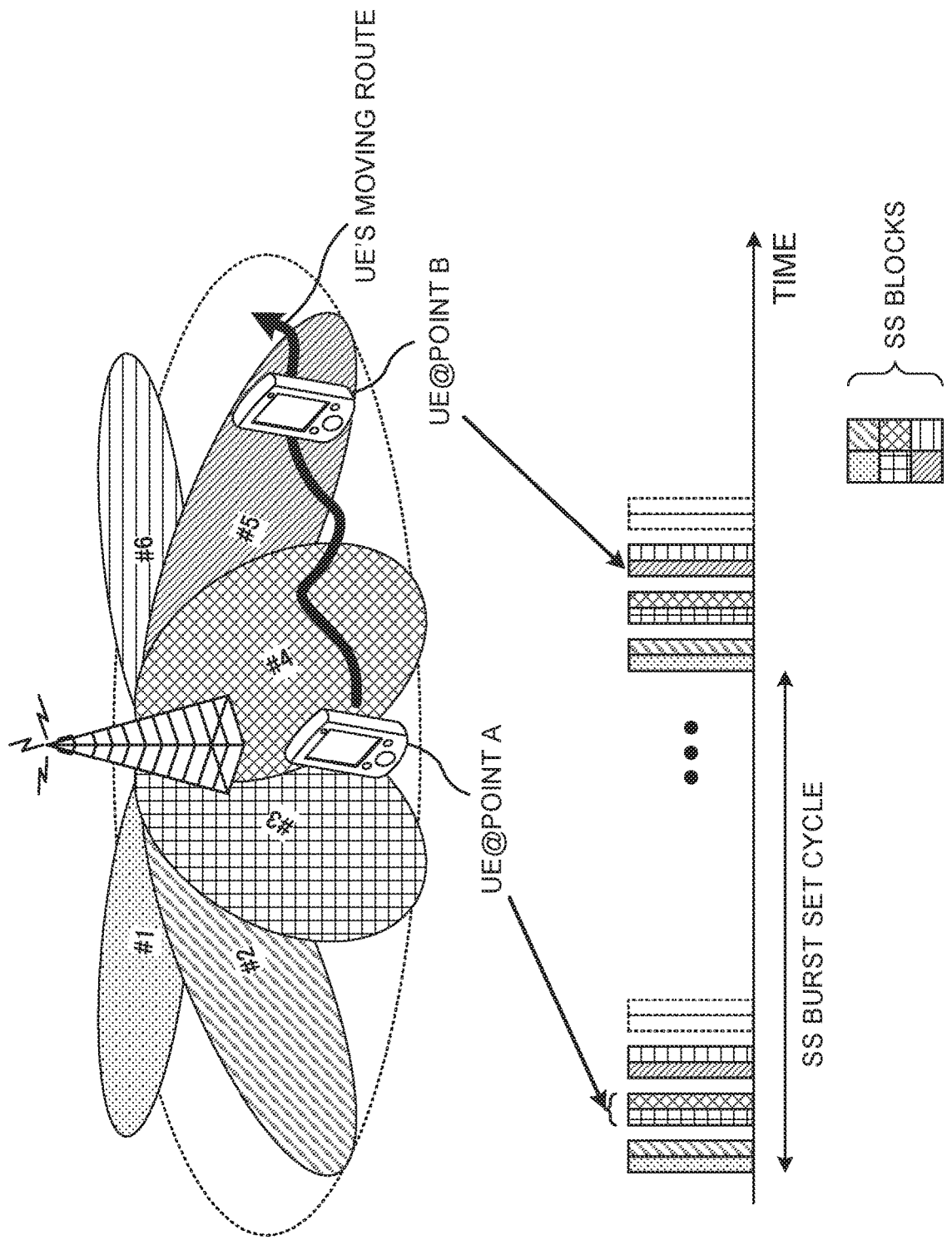
FIG. 2 is a diagram to show an example of SS block transmission in multi-beam operation.

Also, another problem emerges, especially considering the multi-beam scenario. This will be explained below with reference to FIG. 2. FIG. 2 is a diagram to show an example of SS block transmission in multi-beam operation. In this example, the base station transmits every SS block, in the SS burst set cycle, by using a different beam (in this case, by using 6 different beams #1 to #6).

Note that the beam corresponding to each SS block may be a transmitting beam (Tx beam), a receiving beam (Rx beam), or a pair of a transmitting beam and a receiving beam. Note that a pair of a transmitting beam and a receiving beam may be referred to as a "beam pair link (BPL)."

In this example, UE moves from the location of point A to the location of point B. Here, point A is a location where both beams #3 and #4 can be received. The UE receives SS blocks corresponding to beams #3 and #4, respectively. Here, if the UE can jointly receive the PBCHs of these SS blocks, the quality of the PBCH may be improved. However, no research has been done on how allow UE to decide receiving multiple SS blocks jointly.

Also, assume that point B is a location where beam #5 can be received. The UE receives the SS block corresponding to beam #5. In this case, the UE receives an SS block that is different from the SS block corresponding to beam #4, which the UE received before that. If these SS blocks carry the same content, there is no need to read the PBCH of the SS block corresponding to beam #5. However, no method has been studied that allows UE to decide whether to read the PBCH when the UE receives a different SS block.

Provided that communication is controlled based on SS blocks, communication throughput, spectral efficiency and so on might decline unless things that have not been yet examined, such as ones described above, are defined clearly.

Therefore, the present inventors have worked on a method that can reduce the decrease in communication throughput and so on even when communication is controlled based on SS blocks, and arrived at the present invention.

Now, embodiments of the present invention will be described in detail below with reference to the accompanying drawings. Note that the radio communication methods according to the herein-contained embodiments may be used individually or may be used in combinations.

Note that, in the following embodiments, the prefix "NR-" that is used in relationship to signals and channels may be omitted.

(Radio Communication Method)

First Embodiment

In a first embodiment of the present invention, UE may determine the configuration of control resource sets based on the PBCH, and determine the relation between each control resource set and SS block (for example, SS block indices).

For example, the UE may specify an SS block's time index (which is, for example, a symbol index, a slot index, a system frame number, etc., or a combination of these) and the configuration of the PDCCH (for example, search space configuration) for scheduling RMSI, based on the PBCH.

According to the first embodiment, the UE may assume that the configuration and/or the content of the PBCH are common among multiple SS blocks in a given SS burst (or SS burst set). However, when the PBCHs of multiple different SS blocks explicitly specify different SS block time indices, the UE does not have to assume that the configuration and/or the content of the PBCH are common (or not common) among these SS blocks. Here, a given SS burst (or SS burst set) may be comprised of one or more SS bursts (or SS burst sets).

Based on these assumptions, when a different SS block is received (for example when an SS block corresponding to a different SS block index is received), the UE can judge whether or not to read the PBCH of the SS block received. For example, in the event a different SS block is received, the UE may skip the reading (decoding) of the PBCH if the above assumption of "common" applies, or read (decode) the PBCH, in a forcible manner, if the above assumption of "not common" applies.

In the first embodiment, at least one of following embodiments 1.1 to 1.3 may be used as a method of judging the association between control resource sets and SS blocks.

Embodiment 1.1

In embodiment 1.1, explicit mapping (relation) between each control resource set and each SS block is reported to UE. Information about this mapping may contain mapping information for all the SS blocks in a certain SS burst set for a cell (or TRP), or contain mapping information regarding SS blocks in a certain period (for example, SS burst, subframe, slot, etc.). In other words, the same mapping information may be reported in each PBCH in an SS burst set, or different types of mapping information may be reported per SS burst, while the same information is transmitted within an SS burst.

Figure 3:
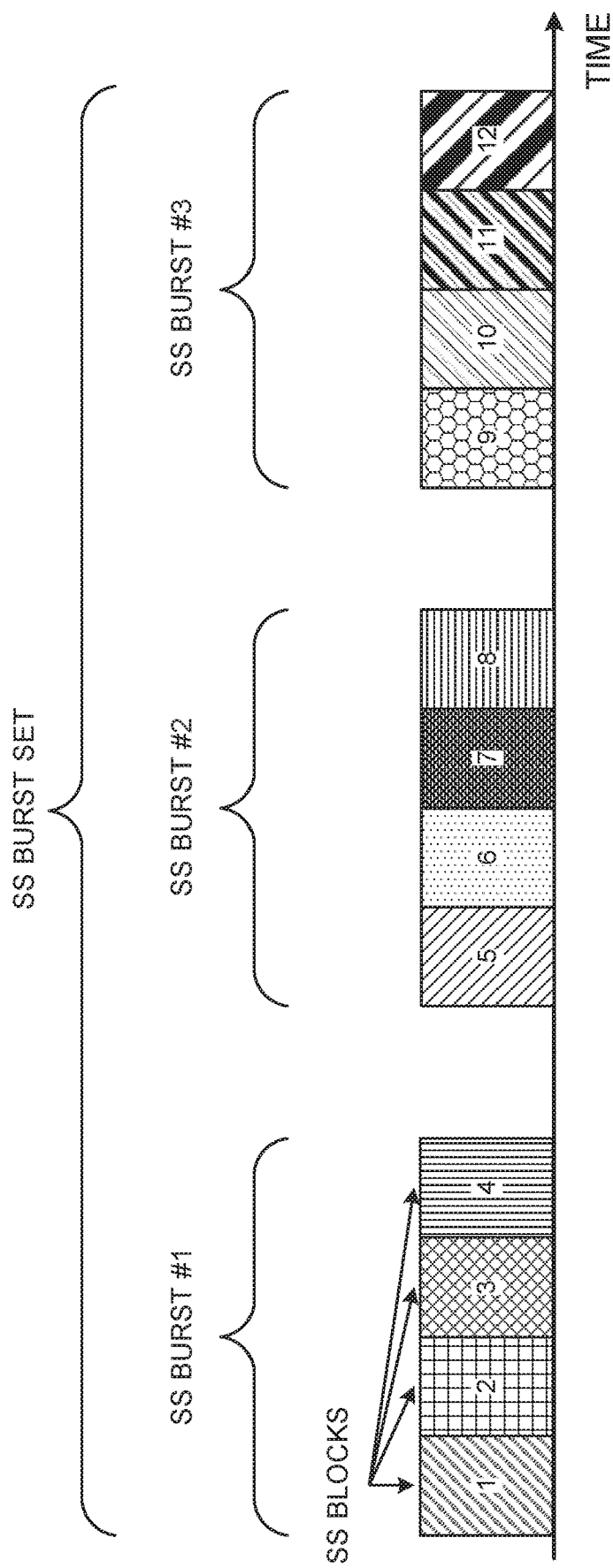
FIG. 3 is a diagram to show an example of embodiment 1.1 of the present invention.

FIG. 3 is a diagram to show an example of embodiment 1.1 of the present invention. In this example, 3 SS bursts (SS bursts #1 to #3) are included in an SS burst set, each SS burst contains 4 SS blocks. That is, the SS burst set contains SS blocks corresponding to SS block indices #1 to #12. However, the application of the present invention is not limited to this configuration.

For example, all the SS blocks in an SS burst set may contain mapping information to show that control resource sets #1 to #12 correspond to SS blocks #1 to #12, respectively.

Also, each SS block in an SS burst may contain mapping information pertaining to each SS block included in the SS burst. For example, each SS block included in SS burst #2 may contain mapping information to show that control resource sets #5 to #8 correspond to SS blocks #5 to #8, respectively.

When embodiment 1.1 is used, the configuration of each control resource set can be designed flexibly, despite the relatively large number of PBCH bits.

Embodiment 1.2

According to embodiment 1.2 of the present invention, UE determines (calculates) which control resource sets are associated with which SS blocks, based on a certain rule or a mathematical equation. This certain rule or mathematical equation may be defined in the specification, or may be reported by way of other cells (for example, LTE cells).

This report from other cells may be sent to (configured in) the UE by using higher layer signaling (for example, RRC (Radio Resource Control) signaling, MAC (Medium Access Control) signaling (for example, MAC CEs (Control Elements)), broadcast information, etc.), physical layer signaling (for example, DCI (Downlink Control Information)), or a combination of these.

The certain rule or mathematical equation may be defined or reported so as to vary between frequency bands (for example, between different carriers, different SS block frequency resources, etc.).

The certain rule or mathematical equation may use at least one of the following parameters:

(1) The time indices of SS blocks included in a certain period (for example, SS burst set, SS burst, subframe, slot, etc.);

(2) The total number of SS blocks included in the certain period (for example, SS burst set, SS burst, subframe, slot, etc.);

(3) The time resource of the control resource set (or a time resource set);

(4) The frequency resource of the control resource set (or a frequency resource set); and (5) The time and/or frequency offset from a certain resource (for example, an SS block).

Explicit bits included in the PBCH for determining a control resource set may be common among different SS blocks. Note that, even in this case, the parameters to use in the certain rule or mathematical equation may be configured to vary between SS blocks, so that different control resource sets may be actually associated with different SS blocks.

By reading one or more PBCHs in a certain SS block, the UE may obtain (and/or determine) the parameters needed to determine a control resource set and determine a control resource set for a different SS block.

FIGS. 4A to 4C are diagrams to show examples of methods for specifying control resource sets based on certain rules or mathematical equations.

FIG. 4A shows an example in which the certain rule has to do with time offset. In this example, the location corresponding to a certain time offset from an SS block finds the control resource set corresponding to this SS block. As shown in FIG. 4A, the time offset may vary per SS block, or may be the same. Control resource sets and SS blocks may be included in the same frequency resource (or an overlapping frequency resource).

Based on the PDCCH in a control resource set, the UE receives the RMSI transmitted in the PDSCH. As shown in FIG. 4A, the PDCCH and the PDSCH that both correspond to an SS block may be transmitted in contiguous periods (for example, in contiguous slots), or may be transmitted in non-contiguous periods.

FIG. 4B shows an example in which the certain rule has to with frequency offset. In this example, the location corresponding to a certain frequency offset from an SS block finds the control resource set corresponding to this SS block. As shown in FIG. 4B, the control resource set may be included in the same time and/or frequency resource as that of the SS block (or included in an overlapping time resource). Also, the PDSCH corresponding to each SS block may be transmitted in a contiguous period (for example, in a contiguous slot), or may be transmitted in a non-contiguous period.

FIG. 4C shows an example in which the certain rule has to do with time and frequency offsets. In this example, time offsets are applied to some of the control resource sets as in FIG. 4A, while other control resource sets are allocated in locations corresponding to certain time and frequency offsets from SS blocks. As shown in FIG. 4C, control resource sets may be included in different time and/or frequency resources than SS blocks. Also, PDCCHs (PDCCHs) that correspond to respective SS blocks may be time-division-multiplexed (TDM) or frequency-division-multiplexed (FDM).

In the event embodiment 1.2 is used, compared to when embodiment 1.1 is used, even though the flexibility of control resource set configuration is subject to constraints imposed by a certain rule or a mathematical equation, the number of PBCH bits required to designate control resource sets can be reduced.

Embodiment 1.3

According to embodiment 1.3 of the present invention, UE determines (calculates) which control resource sets are associated with which SS blocks, based on a certain rule or equation selected from a number of certain rules or mathematical equations. This certain rule or mathematical equation may be defined in the specification, or may be reported by way of other cells (for example, LTE cells). The certain rule or mathematical equation may be defined or reported so as to vary between frequency bands (for example, between different carriers, different SS block frequency resources, etc.).

A command to use a specific rule or mathematical equation may be reported by using the PBCH and/or other cells. Also, the parameters to use in a specific rule or mathematical equation may be reported via the PBCH and/or other cells.

Every rule or mathematical equation may correspond to a different beamforming method. That is to say, either a command to use a specific rule or mathematical equation and the parameters to use in a specific rule or mathematical equation are reported to the UE, so that the UE can determine which beamforming method to use.

For example, in the event analogue BF is used and/or the total number of SS blocks is small, the rules or mathematical equations for control resource sets for individual SS blocks may be mapped, between different control resource sets, by using TDM.

Also, in the event digital BF is used and/or the total number of SS blocks is large, the rules or mathematical equations for control resource sets for individual SS blocks may be mapped, between different control resource sets, by using one of TDM, FDM and SDM, or by using a combination of these. In this case, beam sweeping for control resources can reduce overhead in the time domain.

By reading the PBCH in a certain SS block, the UE may receive a command to use a specific rule or mathematical equation, identify the specific rule or mathematical equation that is needed to select control resource sets, and select control resource sets for different SS blocks.

When embodiment 1.3 is used, a number of rules or mathematical equations needed to select control resource sets are defined, so that, the flexibility of configuration of control resource sets can be reserved compared to when using embodiment 1.2.

According to the first embodiment described above, for example, after a certain SS block is detected, UE can suitably specify the control resource set to monitor.

Second Embodiment

According to a second embodiment of the present invention, UE identifies the configuration of the control resource set associated with an SS block based on the PBCH included in the SS block.

The second embodiment may be configured so that UE cannot basically assume that the configuration and/or the content of the PBCH are common among different SS blocks in a certain SS burst (or SS burst set). However, UE may assume that the configuration and/or the content of the PBCH are common. Here, a given SS burst (or SS burst set) may be comprised of one or more SS bursts (or SS burst sets).

According to the second embodiment, after one or more SS blocks have been measured, UE selects the PBCH to decode.

The UE may decode the PBCH included in the SS block where the best result (measurement quality) has been measured (which is to say, for example, the received power (RSRP) is the highest, the receive quality (RSRQ, RSSI etc.) is the best, and so forth). Note that, if certain conditions are fulfilled, the UE may also decode the PBCHs included in other SS blocks. For example, one such certain condition may be that the measurement quality of another SS block be higher than the measurement quality of the present SS block by a certain offset or more.

In addition, another certain condition may be an event that replaces the serving cell, neighboring cell, PCell, PSCell, SCell and others, with certain SS blocks (for example, the present SS block, other SS blocks, etc.), in measurement report-triggering events (for example, event A1 to A6) defined in existing LTE (for example, LTE Rel. 13).

In addition, another certain condition may be that a command to read out the PBCH included in another SS block be transmitted from the base station to the UE. This reading command may be reported to (configured in) the UE by using higher layer signaling (for example, RRC signaling, broadcast information, etc.), physical layer signaling (for example downlink control information (DCI)), or a combination of these. In response to a measurement report (for example, a measurement report that includes the measurement results of a certain SS block) reported from the UE, the base station may configure the UE to read PBCHs included in other SS blocks.

The UE may be configured to constantly decode the PBCHs included in a certain number of (for example, N) best SS blocks. The certain number may be reported to the UE by way of higher layer signaling and the like, or may be defined by the specification in advance.

A certain SS block in an SS burst set may contain mapping information that identifies 1 control resource set associated with the certain SS block. To explain this with reference to the same case as in FIG. 3, for example, SS block #5 may contain mapping information that indicates that control resource set #5 corresponds to SS block #5. Also, SS block #8 may contain mapping information that indicates that control resource set #8 corresponds to SS block #8.

Note that the SS block index and the control resource set index need not be the same. Also, different SS blocks may be associated with different control resource sets, or may be associated with the same control resource set.

According to the second embodiment described above, it is possible to read the PBCH even if, for example, the best SS block changes in an NR cell. This configuration can reduce the processing load on UE.

Third Embodiment

The embodiments that have been described above have shown examples in which an SS block can be specified by an SS block index, but this is by no means limiting. As for the method of reporting SS block time indices using the PBCH, at least one of following embodiments 3.1 to 3.5 may be used.

Embodiment 3.1

The PBCH contains an explicit bit that represents an SS block time index in an SS burst set.

Embodiment 3.2

The PBCH contains an explicit bit that represents an SS block time index in an SS burst set, and another bit that represents an SS burst index in the SS burst set.

Embodiment 3.3

The PBCH contains an explicit bit that represents an SS burst index (or a subframe index or a slot index) in an SS burst set, and implicitly shows an SS block index in the SS burst (or the subframe or the slot).

Embodiment 3.4

The PBCH contains an explicit bit for an SS block index in an SS burst (or subframe or slot), and implicitly shows an SS burst index (or subframe index or slot index) in an SS burst set.

Embodiment 3.5

The PBCH implicitly shows an SS burst index in an SS burst set (or a subframe index or a slot index) and an SS block index in the SS burst (or the subframe or the slot).

The UE may judge the implicit indications of indices according to embodiment 3.3 to 3.5, based on, for example, at least one of information about the scrambling of the PBCH (for example, the scrambling phase), the cyclic redundancy check (CRC) masking applied to the PBCH, the redundancy version (RV) of the PBCH, the cyclic shift applied to a pre-scrambling coded bit of the PBCH, and the time stamp offset in the polar code used for the PBCH. These may be parameters defined in the specification, or, may be parameters reported from other cells to the UE, for example.

For example, when a PBCH is generated by using a specific cyclic shift in a certain SS block (or a certain SS burst), the UE may judge that the SS block containing the PBCH decoded using this specific cyclic shift is a certain SS block (or an SS block included in a certain SS burst).

FIGS. 5A to 5D are diagrams to show examples of methods of specifying SS blocks.

In FIG. 5A, SS blocks in an SS burst set are configured so that all of these SS blocks can be specified based on SS block indices. This configuration can be realized by, for example, representing SS blocks in an SS burst set by non-overlapping SS block indices. In this example, the UE can specify 1 SS block in an SS burst set, in a unique manner, by one of SS block indices #1 to #12 that are contained explicitly in the PBCH (this corresponds to embodiment 3.1).

In FIG. 5B, SS blocks in an SS burst set are configured so that all of these SS blocks can be specified based on SS burst indices and SS block indices. This configuration can be realized, for example, by representing SS blocks in an SS burst set by non-overlapping SS block indices, and by representing SS bursts in the SS burst set by non-overlapping SS burst indices.

With this example, the UE can identify 1 SS block in an SS burst set, in a unique manner, based on one of the combinations of SS burst indices #1 to #3 and SS block indices #1 to #4, explicitly included in the PBCH (this corresponds to embodiment 3.2). When the configuration shown in FIG. 5B is used, SS blocks can be identified even if the same SS block indices are used in different SS bursts.

In FIG. 5C, as shown in FIG. 5B, SS blocks in an SS burst set are configured so that all of these SS blocks can be specified based on SS burst indices and SS block indices. The UE can identify 1 SS block in an SS burst set, in a unique manner, based on the SS burst index explicitly included in the PBCH and the SS block index that is determined implicitly based on the PBCH (this corresponds to embodiment 3.3).

In FIG. 5D, as shown in FIG. 5B, SS blocks in an SS burst set are configured so that all of these SS blocks can be specified based on SS burst indices and SS block indices. The UE can identify 1 SS block in an SS burst set, in a unique manner, based on the SS burst index explicitly included in the PBCH and the SS block index that is determined implicitly based on the PBCH (this corresponds to embodiment 3.3).

Although not illustrated, as in FIG. 5B, when all the SS blocks in an SS burst set are configured so that they can be identified based on SS burst indices and SS block indices, the UE may identify 1 SS block in the SS burst set, in a unique manner, based on the SS block index that is determined implicitly based on the PBCH and the SS burst index that is determined implicitly based on the PBCH (this corresponds to embodiment 3.5).

According to the third embodiment described above, for example, the UE can uniquely identify SS blocks based on the PBCH.

Fourth Embodiment

A fourth embodiment of the present invention relates to the PBCH joint-receiving operation, assumptions and the like in UE. The PBCH joint-receiving operation, assumptions and the like in UE might include at least one of the following embodiment 4.1 to embodiment 4.5. In other words, when a certain condition is fulfilled, the UE may jointly receive the PBCHs corresponding to multiple SS blocks.

Embodiment 4.1

The UE may assume that PBCHs in a certain SS burst set cannot be received jointly (are not received jointly).

Embodiment 4.1 is suitable when it is assumed that the configuration and/or the content of the PBCH are fundamentally different among several different SS blocks (for example, when the first embodiment and embodiment 3.1 to 3.2 are used, when the second embodiment and embodiment 3.1 to 3.4 are used, etc.).

Note that the UE may receive PBCHs jointly by using different SS blocks in different SS burst sets in a certain period (for example, within a cycle of updating the contents of the PBCH). These different SS blocks are preferably multiple SS blocks corresponding to the same SS block indices in different SS burst sets, but they can be a plurality of SS blocks corresponding to different SS block indices. Here, the cycle of updating the contents of the PBCH may be, for example, 40 ms, 80 ms, 160 ms, and the like.

Embodiment 4.2

The UE may assume that PBCHs can be received jointly by using multiple different SS blocks in a certain period (for example, SS burst, subframe, slot, etc.). Embodiment 4.2 is suitable when it is assumed that the configuration and/or the content of the PBCH are common within the certain period (for example, if the first embodiment and embodiment 3.3 are used).

Embodiment 4.3

The UE may assume that PBCHs can be received jointly using multiple SS blocks that are each transmitted in a different certain period (for example, SS burst, subframe, slot, etc.) and that correspond to the same SS block index. When it is assumed that the configuration and/or the content of the PBCH are common among multiple SS blocks corresponding to the same SS block index, (for example, when the first embodiment and embodiment 3.4 are used), embodiment 4.3 is suitable.

Embodiment 4.2

The UE may assume that PBCHs can be received jointly by using multiple different SS blocks in a certain burst set. Embodiment 4.2 is suitable when it is assumed that the configuration and/or the content of the PBCH are common within the cycle of updating the contents of the PBCH (for example, when the first embodiment and embodiment 3.5 are used).

Embodiment 4.5

Information about the joint receipt of PBCHs (also referred to as "PBCH joint-receipt information," "PBCH joint information," etc.) may be reported to the UE by using multiple different SS blocks in a certain period (for example, the cycle of updating the contents of PBCH, SS burst set, SS burst, subframe, slot, etc.).

The PBCH joint-receipt information may include information that indicates whether or not PBCHs in multiple SS blocks can be joined (or whether or not PBCHs in multiple SS blocks are joined), or information that identifies SS blocks that can be joined (or that are to be joined).

The former information may indicate, for example, that part or all of the SS blocks in a certain period (SS burst, SS burst set, the cycle of updating the contents of the PBCH, etc.) can be joined.

The latter information may include, for example, SS block indices, SS burst indices, SS burst set indices and the like.

Based on PBCH joint-receipt information, the UE may decide to join SS blocks having SS block indices corresponding to a certain value, may decide to join SS blocks included in different SS bursts and corresponding to the same SS index, or may decide to join SS blocks included in a certain SS burst set.

The PBCH joint-receipt information may be reported (configured) to the UE by using higher layer signaling (for example, RRC signaling, broadcast information, etc.), physical layer signaling (for example, DCI, synchronization signals (NR-PSS, NR-SSS, etc.) and so forth), or a combination of these. For example, when PBCH joint-receipt information is reported using a certain PBCH, the UE can receive PBCHs jointly after successfully decoding the certain PBCH.

The PBCH joint information may be reported from an NR cell (for example, an NR serving cell) or may be reported from an LTE cell (for example, an LTE serving cell). For example, PBCH joint-receipt information may be reported from an LTE or NR cell by using measurement configuration information, which is one form of RRC signaling.

According to the fourth embodiment described above, for example, the UE can properly decide to receive a plurality of SS blocks jointly.

(Variations)

Although the embodiments described above have shown a number of cases in which UE can assume that the configuration and/or the content of the PBCH are common (or not common) among multiple different SS blocks in a certain SS burst (or SS burst set). Such assumptions may also be applied to other signals and/or channels.

For example, the UE may assume that the configuration and/or the content of the first certain signal (and/or channel), received based on the first PBCH corresponding to the first SS block in a certain SS burst (or SS burst set), and the configuration and/or the content of a second certain signal (and/or channel), received based on a second PBCH corresponding to a second SS block in the certain SS burst (or SS burst set), are common (or not common).

This certain signal (and/or channel) may be, for example, at least one of RMSI, an unspecified SIB, a control signal, a reference signal, another broadcast channel (for example, a channel to contain RMSI), an NR-PDCCH, an NR-PDSCH to communicate an unspecified SIB, and so on.

The assumptions regarding this certain signal (and/or channel) may be based on the assumptions for the PBCH described above, and for example, the former assumption may be the same as the latter assumption (for example, the UE may judge that the latter assumption is also "common" if the former assumption is "common").

Also, the embodiments described above have shown a number of cases in which, when a different SS block is received (another SS block is received), UE decides whether or not to read the PBCH of the SS block received. Such decision-making may be applied to other signals and/or channels (for example, a certain signal and/or channel received based on the PBCH corresponding to an SS block).

Note that an "SS block" (for example, an "SS block in a certain SS burst (or SS burst set)") as used in these assumptions and/or decisions may be interpreted as meaning a "beam," a "beam group" or the like.

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 6:
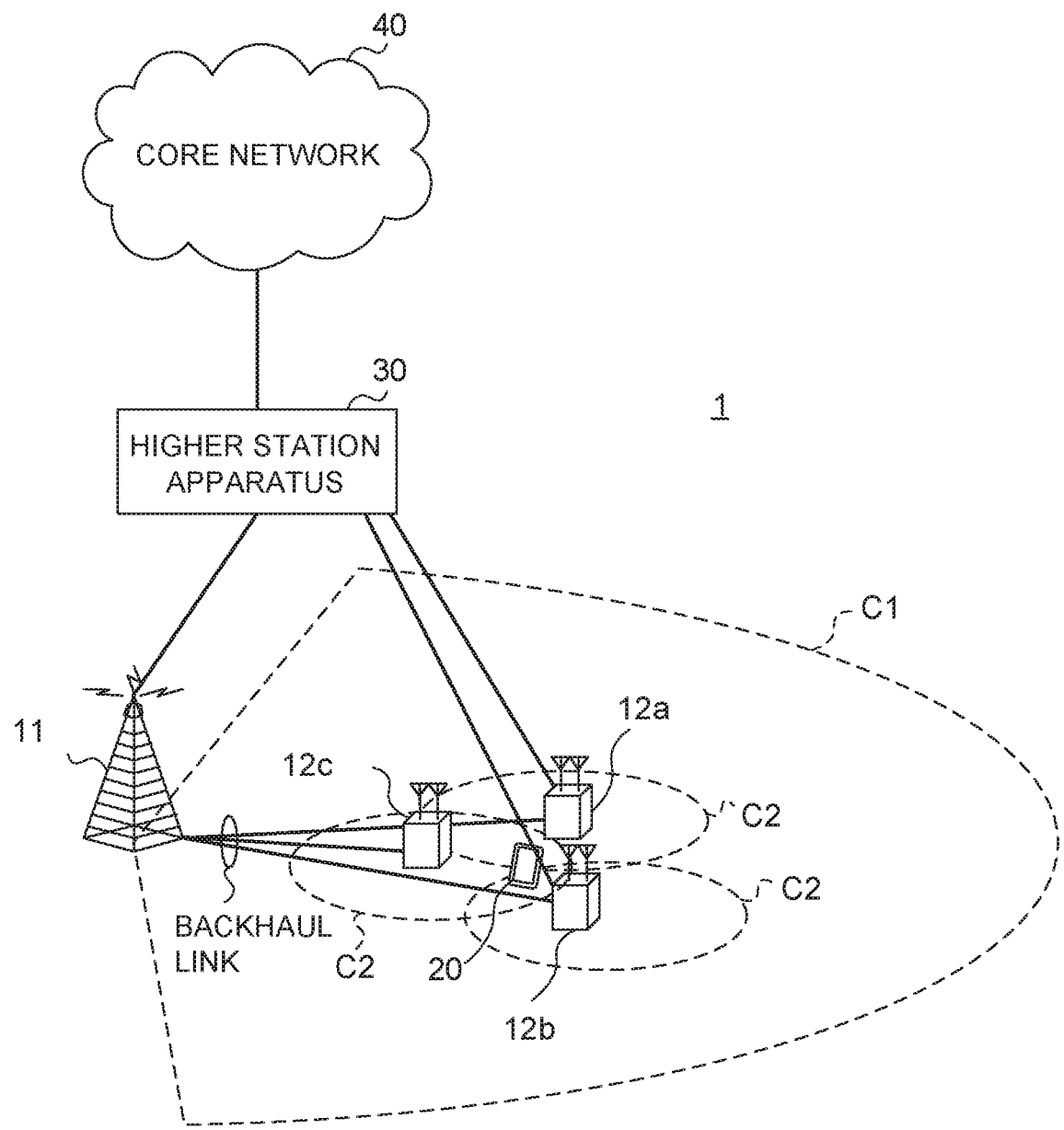
FIG. 6 is a diagram to show an exemplary schematic structure of a radio communication system according to one embodiment of the present invention.

FIG. 6 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD) in each cell. Furthermore, in each cell (carrier), a single numerology may be used, or a plurality of different numerologies may be used.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or contiguous resource blocks per terminal, and allowing a plurality of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated in the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 7:
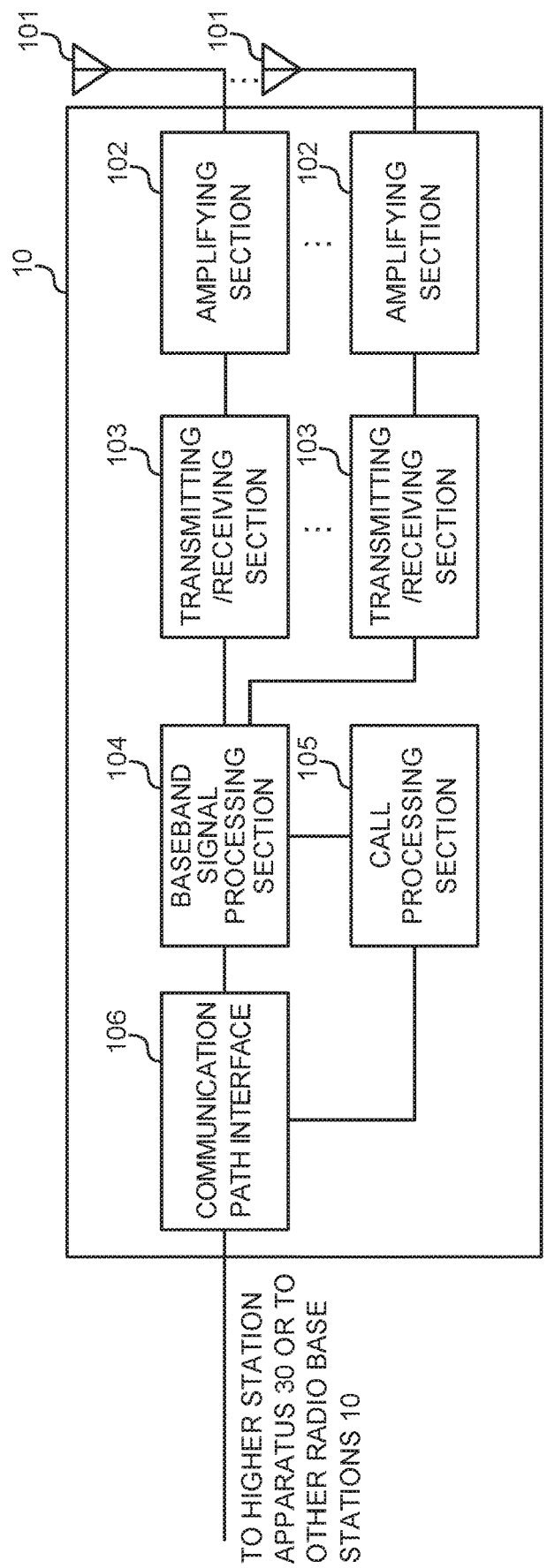
FIG. 7 is a diagram to show an exemplary overall structure of a radio base station according to one embodiment of the present invention.

FIG. 7 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing of communication channels (such as setting up and releasing communication channels), manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit one or more synchronization signal blocks (SS blocks) that contain synchronization signals (for example, the NR-PSS, NR-SSS, etc.) and a broadcast channel (for example, the NR-PBCH). The transmitting/receiving sections 103 may transmit the NR-PBCH with the same content and/or of the same configuration by using different multiple SS blocks.

Also, the transmitting/receiving section 103 may transmit, to the user terminal 20, at least one of information about explicit mapping (association) between control resource sets and SS blocks, mapping information that specifies 1 control resource set associated with a certain SS block, PBCH joint-receipt information, and so on.

Figure 8:
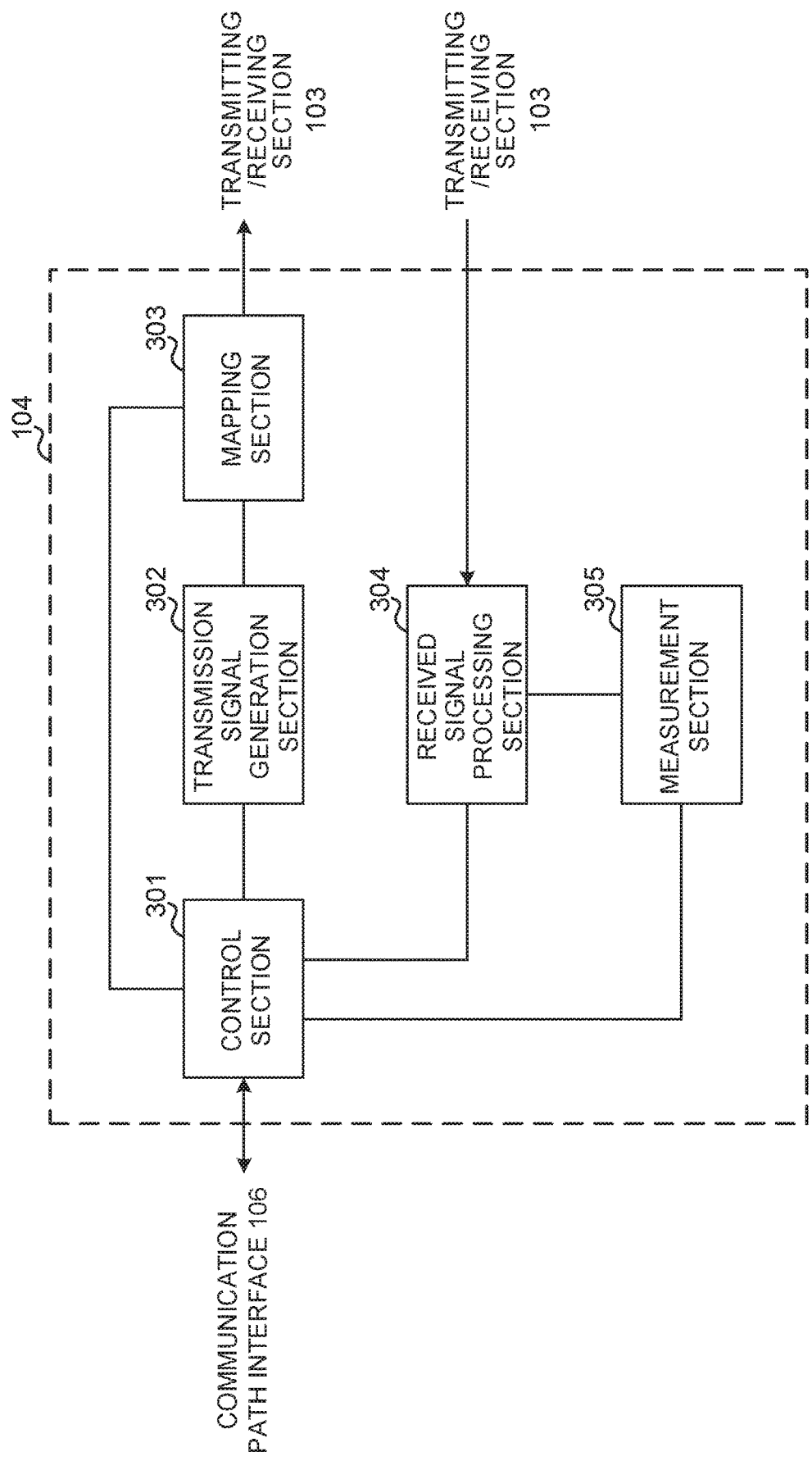
FIG. 8 is a diagram to show an exemplary functional structure of a radio base station according to one embodiment of the present invention.

FIG. 8 is a diagram to show an exemplary functional structure of a radio base station according to one embodiment of the present invention. Note that, although this example primarily shows functional blocks that pertain to characteristic parts of the present embodiment, it may be assumed that the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 401, for example, controls generation of signals in the transmission signal generation section 402, allocation of signals in the mapping section 403, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH), downlink control signals (for example, signals transmitted in the PDCCH and/or the EPDCCH, such as delivery acknowledgement information) and so forth. Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, PSS (Primary Synchronization Signal)/SSS (Secondary Synchronization Signal)), downlink reference signals (for example, CRS, CSI-RS, DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH) and uplink reference signals.

The control section 301 exerts control so that a broadcast channel (NR-PBCH) included in a certain SS block is transmitted, so that the user terminal 20 can identify candidate control resource sets for transmitting the downlink control channel (NR-PDCCH) that is needed to receive RMSI.

Also, the control section 301 may exert control so that information about the association between SS blocks and control resource sets is included in the NR-PBCH. Also, the control section 301 may exert control so that information about the association between other SS blocks (SS blocks apart from the SS block containing the NR-PBCH) and control resource sets is included in the NR-PBCH.

Also, the control section 301 may exert control so that information about the parameters to use in certain rules or mathematical equations, information for specifying certain rules or mathematical equations and so on are included in the NR-PBCH.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and UL grants, which report uplink data allocation information, based on commands from the control section 301. DL assignments and UL grants are both DCI, in compliance with DCI formats. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to certain radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs information that has been decoded through receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength Indicator)), transmission path information (for example, CSI), and so on. The measurement results may be output to the control section 301.

(User Terminal)

Figure 9:
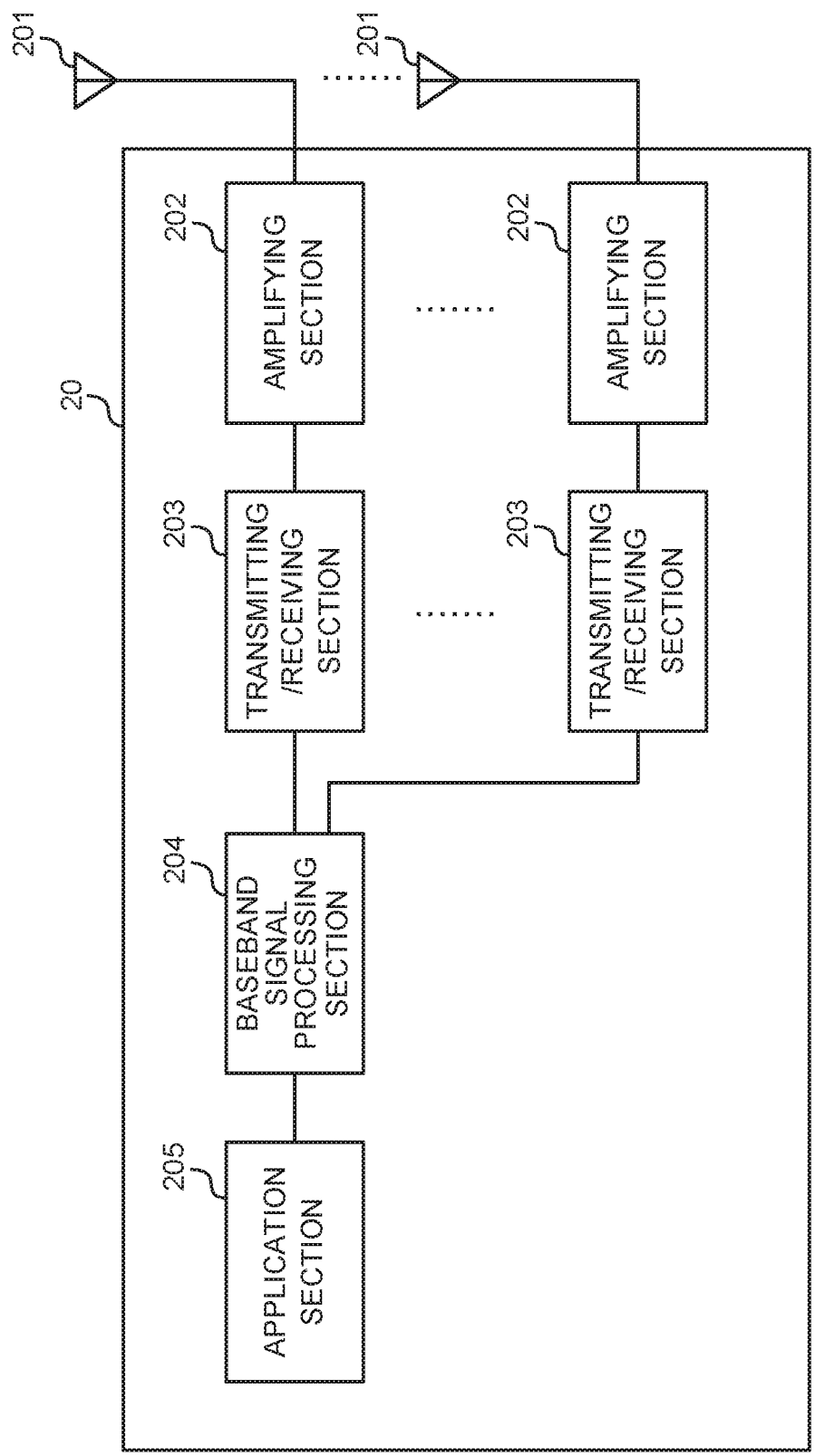
FIG. 9 is a diagram to show an exemplary overall structure of a user terminal according to one embodiment of the present invention.

FIG. 9 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information may be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit one or more synchronization signal blocks (SS blocks) that contain synchronization signals (for example, the NR-PSS, NR-SSS, etc.) and a broadcast channel (for example, the NR-PBCH). The transmitting/receiving sections 203 may joint-receive NR-PBCHs included in different multiple SS blocks, respectively, based on information on joint receipt of the NR-PBCH.

Also, the transmitting/receiving sections 203 may receive at least one of information about explicit mapping (association) between control resource sets and SS blocks, mapping information that identifies 1 control resource set associated with a certain SS block, and PBCH joint-receipt information, from the radio base station 10.

Figure 10:
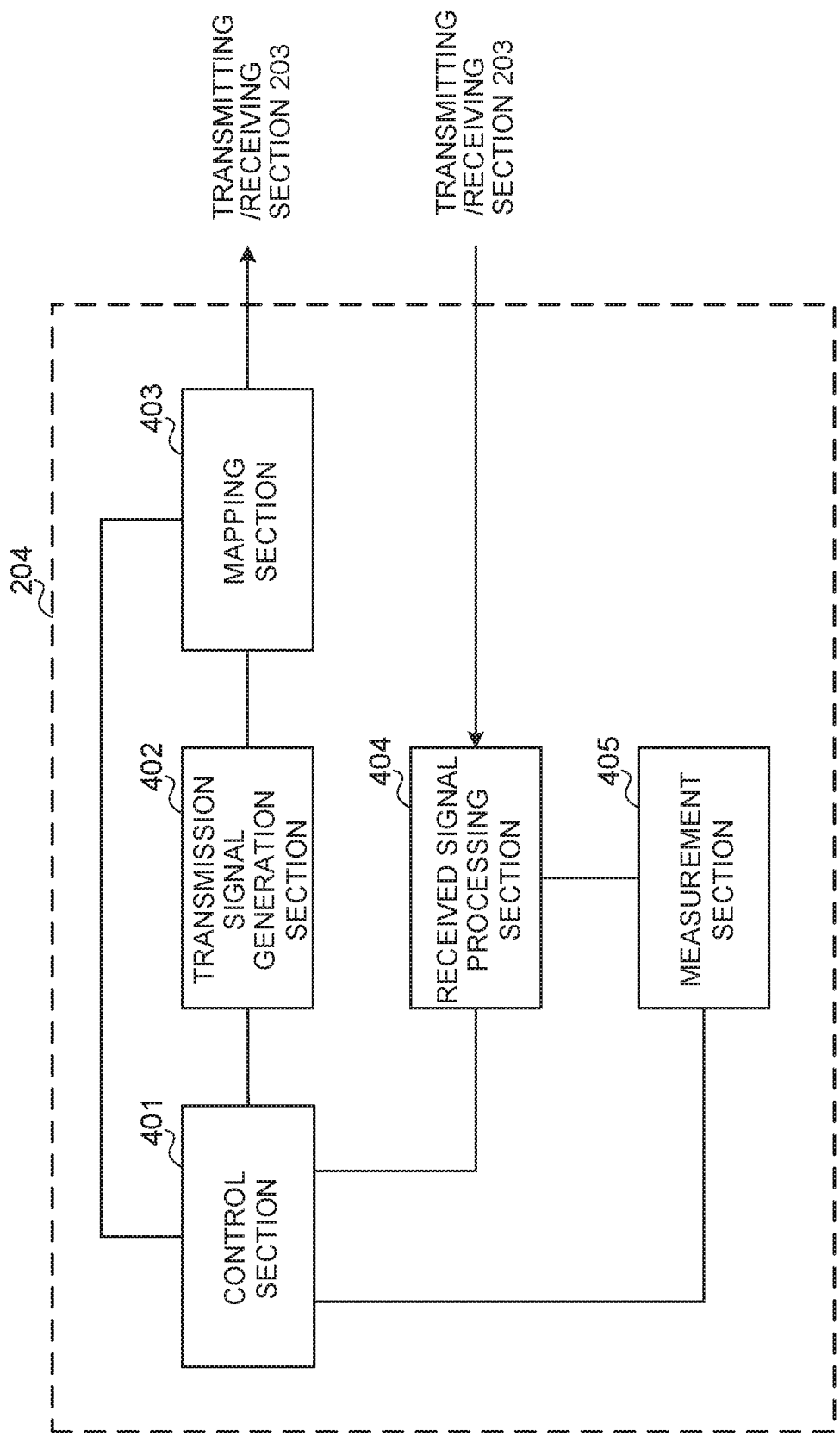
FIG. 10 is a diagram to show an exemplary functional structure of a user terminal according to one embodiment of the present invention.

FIG. 10 is a diagram to show an exemplary functional structure of a user terminal according to one embodiment of the present invention. Note that, although this example primarily shows functional blocks that pertain to characteristic parts of the present embodiment, it may be assumed that the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 identifies candidate control resource sets for transmitting the downlink control channel (NR-PDCCH) that is needed to receive RMSI, based on a broadcast channel (NR-PBCH) included in a certain SS block.

For example, the control section 401 may determine the relationship between SS blocks and control resource sets based on an NR-PBCH, and specify the control resource set corresponding to the SS block in which this NR-PBCH is contained.

Also, the control section 401 may determine the relationship between other SS blocks (SS blocks apart from the SS block containing that NR-PBCH) and control resource sets, based on the NR-PBCH.

Furthermore, the control section 401 may also specify the above control resource set based on a certain rule or mathematical equation and parameter information reported by an NR-PBCH.

Furthermore, the control section 401 may also specify the control resource set based on a certain rule or mathematical equation that is identified by using information for identifying a certain rule or mathematical equation, which is reported by using an NR-PBCH, and parameter information reported through the NR-PBCH.

Also, when various pieces of information reported from the radio base station 10 are acquired from the received signal processing section 404, the control section 401 may update the parameters used in the control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information and/or channel state information (CSI) based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs information that has been decoded through receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 11:
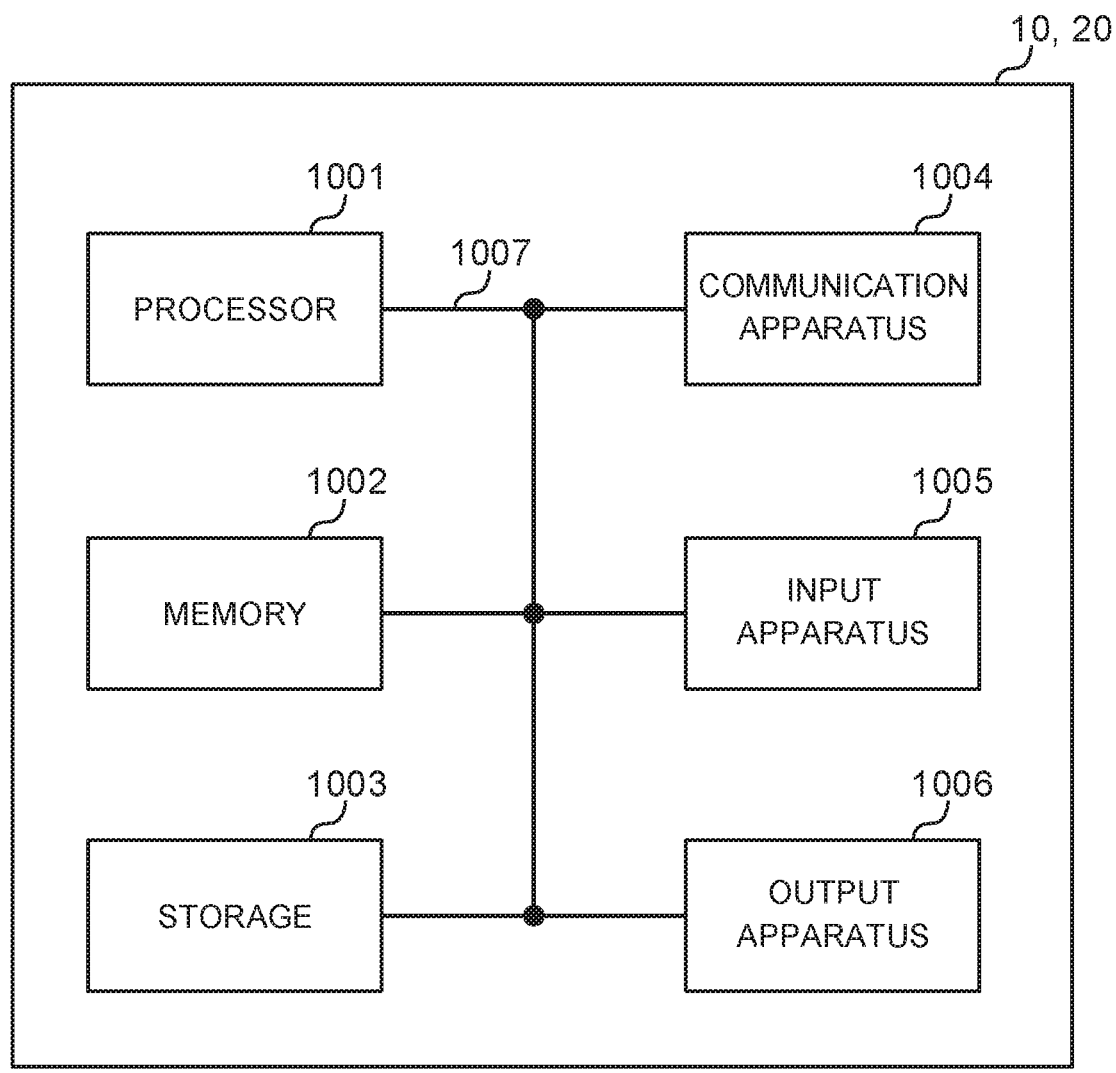
FIG. 11 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 11 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read certain software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single-carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to certain values, or may be represented using other applicable information. For example, a radio resource may be specified by a certain index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives a first synchronization signal block among a plurality of synchronization signal blocks, each synchronization signal block of the plurality of the synchronization signal blocks including a synchronization signal and a broadcast channel; and
   a processor that determines, based on information of a frequency offset notified by a master information block (MIB) transmitted on a broadcast channel of the first synchronization signal block, a control resource set, corresponding to a second synchronization signal block of the plurality of synchronization signal blocks, for receiving system information,
   wherein the control resource set refers to a set of candidate resources for monitoring a downlink control channel, and
   wherein the receiver receives a command, by the broadcast channel of the first synchronization signal block, to use the information of the frequency offset used to determine the control resource set, and the processor identifies the information of the frequency offset used to determine the control resource set.

2. The terminal according to claim 1, wherein the receiver receives and combines broadcast channels that are respectively included in the plurality of synchronization signal blocks based on information regarding combined reception of the broadcast channels.

3. A radio communication method for a terminal comprising:
   receiving a first synchronization signal block among a plurality of synchronization signal blocks, each synchronization signal block of the plurality of the synchronization signal blocks including a synchronization signal and a broadcast channel;
   receiving a command, by a broadcast channel of the first synchronization signal block, to use information of a frequency offset used to determine a control resource set, corresponding to a second synchronization signal block of the plurality of synchronization signal blocks, for receiving system information,
   wherein the information of the frequency offset notified by a master information block (MIB) transmitted on the broadcast channel of the first synchronization signal block, and identifying the information of the frequency offset used to determine the control resource set; and determining, based on the information of the frequency offset, the control resource set, wherein the control resource set refers to a set of candidate resources for monitoring a downlink control channel.

4. A base station comprising:

a processor that generates information regarding a control resource set, corresponding to a second synchronization signal block, for receiving system information; and a transmitter that transmits a first synchronization signal block including a synchronization signal and a broadcast channel, the broadcast channel including the information, wherein the control resource set refers to a set of candidate resources for monitoring a downlink control channel, wherein the information is information of a frequency offset included in a master information block (MIB) transmitted on the broadcast channel, and wherein the processor commands, by the broadcast channel, to use the information of the frequency offset used to determine the control resource set, and commands to identify the information of the frequency offset used to determine the control resource set.

5. A system comprising:

a terminal; and a base station, wherein:

the terminal comprises:

a receiver that receives a first synchronization signal block among a plurality of synchronization signal blocks, each synchronization signal block of the plurality of the synchronization signal blocks including a synchronization signal and a broadcast channel; and a processor of the terminal that determines, based on information of a frequency offset notified by a master information block (MIB) transmitted on a broadcast channel of the first synchronization signal block, a control resource set, corresponding to a second synchronization signal block of the plurality of synchronization signal blocks, for receiving system information, wherein the control resource set refers to a set of candidate resources for monitoring a downlink control channel, and wherein the receiver receives a command, by the broadcast channel of the first synchronization signal block, to use the information of the frequency offset used to determine the control resource set, and the processor of the terminal identifies the information of the frequency offset used to determine the control resource set, and the base station comprises:

a processor of the base station that generates the information; and a transmitter that transmits the first synchronization signal block, wherein the processor of the base station commands, by the broadcast channel, to use the information of the frequency offset used to determine the control resource set, and commands to identify the information of the frequency offset used to determine the control resource set.

* * * * *